United States Patent [19]
Hicks

[11] Patent Number: 5,133,287
[45] Date of Patent: Jul. 28, 1992

[54] CONTINUOUS FISH FEEDING SYSTEM

[75] Inventor: Charles E. Hicks, Shepherdstown, W. Va.

[73] Assignee: Genesis Aquaculture, Inc., Shepherdstown, W. Va.

[21] Appl. No.: 642,945

[22] Filed: Jan. 18, 1991

[51] Int. Cl.$^5$ .............................. A01K 61/00
[52] U.S. Cl. ........................................ 119/3
[58] Field of Search ...................... 119/2, 3, 51.04

[56] References Cited

U.S. PATENT DOCUMENTS

| | | | |
|---|---|---|---|
| 3,421,479 | 1/1969 | Fleming | 119/51.11 |
| 3,528,588 | 9/1970 | Moore | 222/193 |
| 3,874,340 | 4/1975 | Lemond et al. | 119/51.04 |
| 4,116,164 | 9/1978 | Shabi et al. | 119/3 |
| 4,203,389 | 5/1980 | Gasper, Jr. et al. | 119/3 |
| 4,279,220 | 7/1981 | Kukurba | 119/51.11 |
| 4,324,203 | 4/1982 | Chiappetti | 119/51.11 |
| 4,359,014 | 11/1982 | Molaug et al. | 119/51 R |
| 4,422,409 | 12/1983 | Walker et al. | 119/51.11 |
| 4,516,528 | 5/1985 | Jones | 119/3 |
| 4,657,675 | 4/1987 | Zan | 210/170 |
| 4,848,275 | 7/1989 | Swanson | 119/3 |
| 4,852,519 | 8/1989 | Karlsen | 119/3 |

FOREIGN PATENT DOCUMENTS

| | | | |
|---|---|---|---|
| 1069099 | 6/1976 | Japan | 119/3 |
| 0873999 | 10/1981 | U.S.S.R. | 119/3 |
| 8808665 | 11/1988 | World Int. Prop. O. | 119/3 |

Primary Examiner—Robert P. Swiatek
Assistant Examiner—Nicholas D. Lucchesi
Attorney, Agent, or Firm—John E. Benoit

[57] ABSTRACT

A continuous feeding process is provided in a flow-through container wherein the input oxygen content of the water flow is measured and a signal is sent to a system processor. The system processor controls the output of a feeder which supplies a continuous controlled amount of feed to the fish, with the amount of the feed being directly related to the oxygen content of the water. The output oxygen content is also measured and a signal is sent to the system processor. In response to the input and output signals, oxygen is controllably supplied to the input side of the flow-through container. A photosensor is also connected to the processor so as to limit the feeding process to daylight hours.

6 Claims, 1 Drawing Sheet

CONTINUOUS FISH FEEDING SYSTEM

The present invention relates generally to fish feeding in any aquatic culture system and specifically to culture systems commonly referred to as flow through systems (raceways, tanks, circular containers or others).

Aquaculture systems in use today consist of many types of culture units and configurations. Most utilize flow through raceways, tanks, or ponds for the bulk of the production. All of these systems were developed to provide the aquatic animal with an environment rich in oxygen and low in waste materials (metabolites). Many rearing models have been developed to depict actual conditions in the flow through systems so that fish loading, production, and production forecasting can be accomplished. An article directed to this subject matter is "Feeding Levels for Fish Fed Formulated Diets" by Harry Westers and appears in THE PROGRESSIVE FISH-CULTURIST, 1987, pp. 87-92. This article discusses the theory of fish feeding and reference is made thereto for a detailed discussion of such theory.

The carrying capacity of a particular aquaculture facility directly influences its total production on an annual basis, thus affecting the capability of the system to generate dollars. Carrying capacity can be expressed as weight per unit volume, pounds per cubic foot or kilograms per cubic meter, or as weight per unit of water flow (density), pounds per gallon per minute or kilograms per liter per minute. Carrying capacity expressed in weight per unit of flow is often termed loading. Factors which affect loading also affect the total productive capacity of the facility or fish farm. Water flow, water quality, species of fish, feeding rate, and size of fish all affect how many pounds of fish can be loaded per gallon per minute. Water flow is important because it provides the life support system for the fish. Water is the conveyor of oxygen to the fish and the vehicle for disposal of waste material. Solid waste as well as ammonia is removed by water. It is obvious that oxygen is necessary to maintain the health and well being of the fish. Additionally, oxygen is directly related to loading. According accepted practice, 200 grams of oxygen are necessary to metabolize a kilogram of fish food. This is the equivalent value of 0.22 pounds of oxygen for every pound of food. It is also known that every pound of food fed will produce about 2.5 oz. of ammonia. Reducing water flow, oxygen, and ammonia to the lowest common denominator, the system or facility loading is then related to the total amount of food fed over a particular time.

Within a raceway or other flow through system, oxygen availability is usually at a given level unless enhanced. Oxygen which is above the minimum level required to sustain the life of the fish and metabolize food exits the raceway and is lost.

The present invention adjusts the feeding rate based on the available oxygen level in the flow through system so that continuous, uninterrupted feeding is attainable.

Aquaculture facilities use a variety of feeding systems from simple demand feeders to elaborate pneumatic systems controlled by processors. All systems have unique advantages and specific disadvantages. The most common disadvantage is that all are essentially batch feeders that transport and dispense a specific amount of feed over an established time period. Demand feeders approach continuous feeding more closely than others; however, they also present particular mechanical problems and are not controlled by available oxygen.

Demand feeders are triggered by fish activity around a rod that, when moved, releases feed from a hopper-type reservoir. Because physical contact with the rod is necessary for feed release, various situations occur which produce undesirable results. For example, in some species of fish, hierarchies develop and only the most aggressive individuals obtain enough feed. This results in uneven feeding and growth of the fish. Some species of fish will not directly contact the demand feeder rods and the release of feed is incidental to their feeding needs. Fish on demand feeders often feed sporadically, sometimes causing feeding frenzies. When this occurs, severe oxygen depression can take place before feeding stops, causing physiological stress to the fish. Feed is often dumped, which also causes oxygen depression due to microbial biological oxygen demand. Oxygen depletion is stress, and stress is a precursor to fish disease. The problems associated with demand feeders and the other batch feeders have led to the present invention.

The process of the present invention delivers a specific quantity of feed in a continous, substantially uninterrupted method over time, with the system output being variable and adjustable to operate according to oxygen availability. Provision is made for adding oxygen to the system as needed. The objects of this invention are detailed and apparent in the following description and drawings.

BRIEF SUMMARY OF THE INVENTION

The present invention allows increase or decrease of the feeding rate based on the available oxygen level. Input and output oxygen levels in a flow through system are measured and continuous, uninterrupted feeding is attainable based upon such measurements. A system processor, in response to measured oxygen levels, controls the output of a feeder or feeders which supply a continuous, controlled amount of feed to the fish. Additionally, in response to the input and output measurements, oxygen may be controllably supplied to the input side of the flow through system in order to maintain the desired oxygen content of the water within the raceway. A photosensor may be used to send a signal to the processor so as to limit the feeding process to daylight hours if the photoperiod is not controlled.

DETAILED DESCRIPTION OF THE PREFERRED EMBODIMENT

Figure 1:
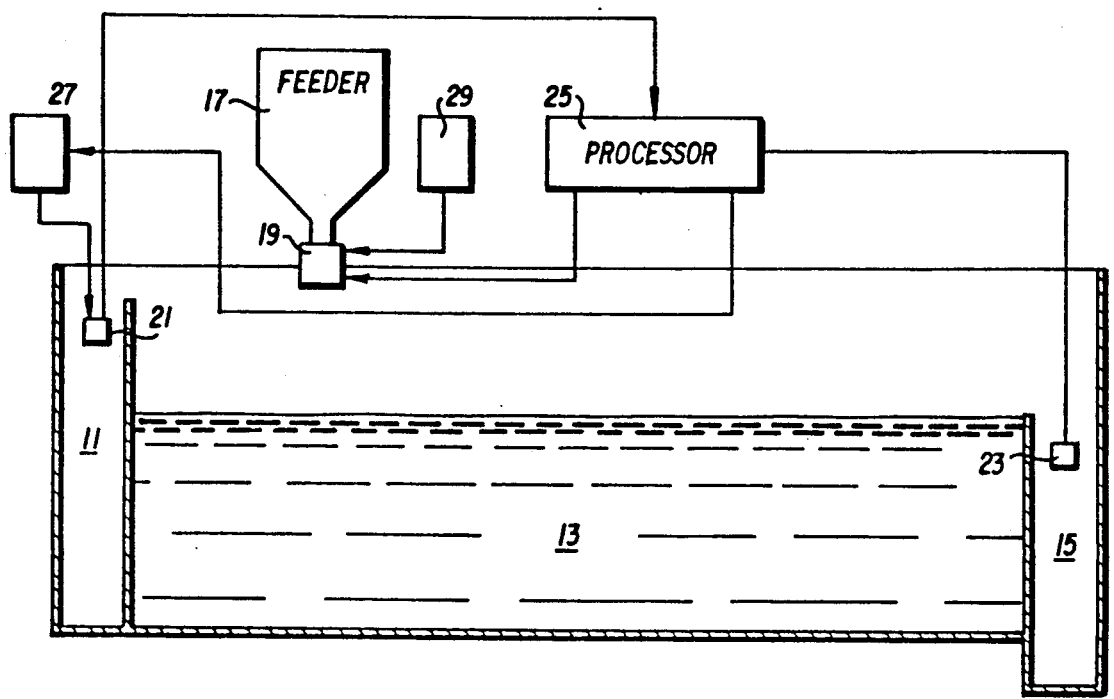
FIG. 1 is a schematic representation of the feeding process of the present invention.

Referring to FIG. 1, there is schematically shown a diagram for carrying out the process of the present invention. Raceway input 11 leads to pond or feeding area 13 with an output effluent trough 15. Bin 17 carries food which is dispensed to continuous feeder 19. Continuous feeder 19 may take many forms, such as a worm screw feeder. The requirement of the feeder is that it is adjustable so that it will supply feed at a controlled, substantially uninterrupted rate to feeding area 13 when in operation.

Input oxygen sensor 21 is placed in raceway input 11 and output oxygen sensor 23 is placed in effluent trough 15. Signals from oxygen sensors 21 and 23 are fed to system processor 25, again which may be of any well known type of signal processor. Processor 25, in turn, controls the rate of supply from continuous feeder 19.

Figure 2:
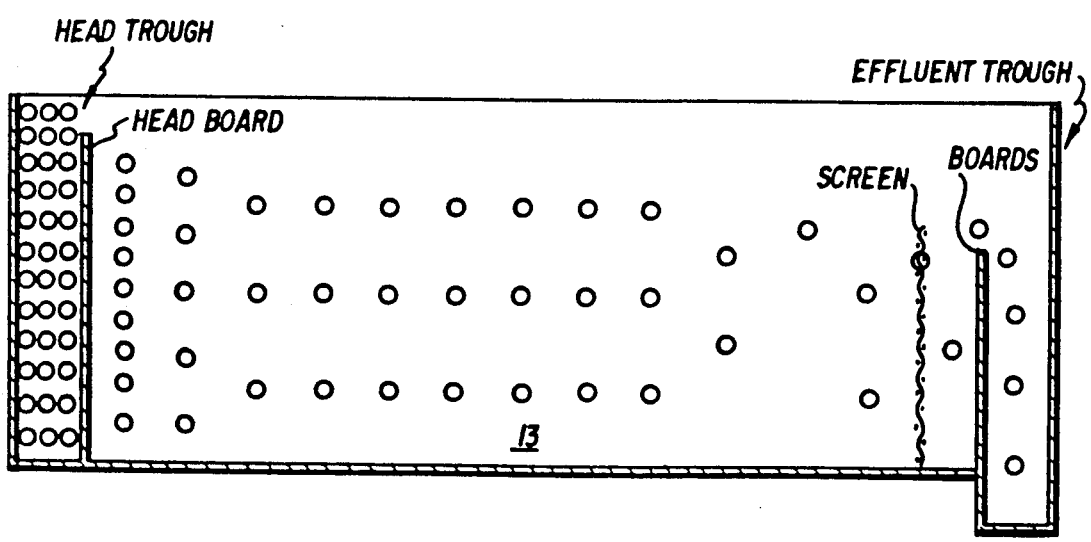
FIG. 2 is a representation of raceway flow.

Processor 25 also delivers an output signal to oxygen supply 27, which also receives a signal from the input oxygen sensor so that a controlled amount of oxygen may be added to the system. This permits controlled feeding to be directly related to the oxygen content of pond 13. It further provides a system for maintaining the oxygen content at a substantially fixed level so that the feed rate can be established and continued over the desired period of feeding. FIG. 2 is a schematic illustration of the flow in raceway 13 with the O's representing oxygen flow. Since fish feed only during daylight hours, the desired period of feeding is during those daylight hours; and it has been found that by use of a continuous and substantially uninterrupted feeding system during that time, the system can be loaded to the maximum oxygen availability and, thus, increase production.

Since feeding is to be done only during daylight hours, and since it is desirable to avoid constant attending of the system, a photosensor and associated photovoltaic generator 29 provide the power input to feeder 19, with the result that the system works only during the daylight hours.

The following example is given to illustrate the comparison of the present continuous feeding system to that of a normal feeding system.

EXAMPLE

Referring to FIG. 2, the O's represent molecules of oxygen flowing through the raceway. The water is a conveyor moving the oxygen through the system. In a raceway, the action never stops. If a stop-action picture is assumed, however, there would be a definite concentration of oxygen available to the fish for burning food. In this example, the flow is 240 gpm,
the oxygen level is 11 mg/L, and
at least 5 mg/L is necessary to sustain trout or at least keep stress at a minimum.

As a result, there are 6 mg/L available for food and growth purposes. The following calculation determines the amount of oxygen. Assume there are 12 hours of daylight and fish will feed only during the daylight period.

mg/L = milligrams per liter
gpm = gallons per minute
L/gal = liters per gallon
min/h = minutes per hour
h = hours of daylight $$\text{GRAMS OF } O_2 = \frac{(O_2 \text{ mg/L})(\text{gpm})(\text{L/gal})(\text{min/h})(h)}{1000 \text{ mg/gm}}$$

Using the above parameters, the equation is:

$$\text{Grams } O_2 = \frac{(6 \text{ mg/L})(240 \text{ gpm})(3.785 \text{ L/gal})(60 \text{ min/hr})(12 \text{ h})}{1000 \text{ mg/gm}}$$

Grams $O_2$ = 3924 (Available for Metabolism)

$$\text{Pounds of Oxygen} = \frac{3924 \text{ GRAMS } O_2}{454 \text{ GRAMS PER POUND}}$$

= 8.64 POUNDS

As indicated, 0.22 pounds of oxygen is needed for each pound of food; therefore, $$\text{POUNDS OF FEED} = \frac{8.64 \text{ POUNDS } O_2}{0.22 \text{ POUNDS } O_2 \text{ PER POUND OF FOOD}}$$

POUNDS OF FEED FOR 12-HOUR PERIOD = 39 POUNDS

The calculations indicate that the system described in the example has the capability (oxygen available) to handle 39 pounds of fish food over a 12-hour period.

INTERMITTENT FEEDING

Assume a two-times-daily feeding schedule is in operation, the water temperature is 50° F. and the raceway contains a number of 11-inch trout. Further assume the period required for the fish to consume and metabolize all feed at each feeding is two hours. Utilizing similar calculations as set forth above, the oxygen available is enough for 6.5 pounds of feed (39/6) for each individual two-hour feeding period. Accordingly, the total amount of feed corresponding with the oxygen availability for a two-times-daily feeding is 13 pounds. Increasing the intermittent frequency of feeding does increase the amounts fed daily, but there is a point at which labor becomes a significant factor if hand-feeding is employed.

Relating the capacity of a system for providing oxygen for the metabolic processes to loading emphasizes that increased feeding frequency greatly increases loading and production. The example states the fish are approximately 11 inches in length. At 50° F., standard trout feeding procedure recommends feeding at about 0.9% of body weight per day. Assuming two feedings per day and a calculated total feed amount of 13 pounds, loading is determined by dividing the amount of feed per day by the percent to feed daily.

$$\text{POUNDS OF FISH} = \frac{\text{TOTAL FEED FED PER DAY}}{\text{FEED RATE PER DAY}}$$

$$= \frac{13 \text{ POUNDS}}{0.009}$$

= 1444 POUNDS OF FISH $$\text{LOADING} = \frac{\text{POUNDS OF FISH}}{\text{GALLONS PER MINUTE}}$$

$$= \frac{1444 \text{ POUNDS}}{240 \text{ GALLONS PER MINUTE}}$$

= 6.57 POUNDS PER GALLON PER MINUTE

CONTINUOUS FEEDING

The previous calculations concerning oxygen availability indicate that a total of 39 pounds of feed can be fed over a full 12-hour, or daylight, period with adequate oxygen availability. Using the same calculations for loading under the continuous, uninterrupted feeding of the present system results in increased production.

$$\text{POUNDS OF FISH} = \frac{39 \text{ POUNDS OF FEED}}{0.009}$$

= 4333 POUNDS OF FISH $$\text{LOADING} = \frac{4333 \text{ POUNDS OF FISH}}{240 \text{ GALLONS PER MINUTE}}$$

= 18 POUNDS PER GALLON PER MINUTE

This level is three times higher than that calculated for the two-times-daily feeding schedule. The important fact is that increased loading relates directly to annual production. If a system can be loaded to maximum oxygen availability, production will increase. In the example, loading is three times higher at a continuous feeding level of 39 pounds per day than a feeding level of 13 pounds twice daily. Since the intermittent feeding system can handle only a total of 6.5 pounds of feed twice daily, production is limited thereby. In addition, all oxygen that is not utilized is wasted in a system where batch feeding is employed. Effective use of the oxygen only occurs during the feeding period.

The present invention, which matches continuous feeding with the oxygen available, provides substantially maximum production.

The above description and drawings are illustrative, only, as the scope of the invention is to be limited only by the following claims.

I claim:

1. A process for feeding fish in a flow-through water system comprising
   continuously measuring the oxygen content of the water at the input of the system;
   providing a continuous controllable feed supply to a feeding area within said system; and
   controlling the amount of feed in said continuous feed supply in a proportional relationship to said continuously measured oxygen content of the water at the input of the system.

2. The process of claim 1 further comprising terminating the feed supply during non-daylight hours.

3. The process of claim 1 further comprising continuously measuring the oxygen content of the water at the output of the system; and
   supplying oxygen at the input of the system in response to the continuously measured difference of the oxygen in the water between the input and output of the system so as to maintain a substantially constant oxygen content in said feeding area.

4. The process of claim 1 further comprising limiting said feed supply to daylight hours.

5. The process of claim 1 further comprising supplying power to said controllable feed supply from a voltaic generator.

6. The process of claim 1 wherein the feed supply is substantially dry when delivered to the feeding area.

* * * * *